United States Patent [19]

Grosche et al.

[11] 4,144,311
[45] Mar. 13, 1979

[54] PURIFYING SALTS CONTAINING ORGANIC POLLUTANTS

[75] Inventors: Michael Grosche; Roland Höfer; Arnd Stüwe, all of Leverkusen, Fed. Rep. of Germany

[73] Assignee: Bayer Aktiengesellschaft, Leverkusen, Fed. Rep. of Germany

[21] Appl. No.: 817,078

[22] Filed: Jul. 18, 1977

[30] Foreign Application Priority Data

Jul. 22, 1976 [DE] Fed. Rep. of Germany ....... 2632954

[51] Int. Cl.² .................... C01F 11/16; C01D 5/16
[52] U.S. Cl. .................... 423/155; 423/178; 423/207; 423/659
[58] Field of Search .......... 423/659, DIG. 12, 499, 423/155, 178, 207

[56] References Cited

U.S. PATENT DOCUMENTS

| Sn. 292,742 | 7/1943 | Beck et al. ............. 423/659 |
|---|---|---|
| 792,632 | 6/1905 | Tee ..................... 423/499 X |
| 3,647,358 | 3/1972 | Greenberg ............. 423/DIG. 12 |
| 3,845,190 | 10/1974 | Yosim et al. .......... 423/659 X |
| 3,852,188 | 12/1974 | Dugan et al. .......... 423/DIG. 12 |

FOREIGN PATENT DOCUMENTS 242791 1/1963 Australia .................. 423/659

*Primary Examiner*—O. R. Vertiz
*Assistant Examiner*—Gary P. Straub
*Attorney, Agent, or Firm*—Sprung, Felfe, Horn, Lynch & Kramer

[57] ABSTRACT

A process for purifying organically polluted salts comprising forming a melt of said salts at a temperature of from about 600° to 1000° C., and contacting salt melt with an oxygen-containing gas. Acidic or basic fluxes may be present. The heat to maintain the mass molten may be supplied by electrodes which dip into the melt and which may be hollow so oxygen can be introduced therethrough. A suitable apparatus is also described.

7 Claims, 7 Drawing Figures

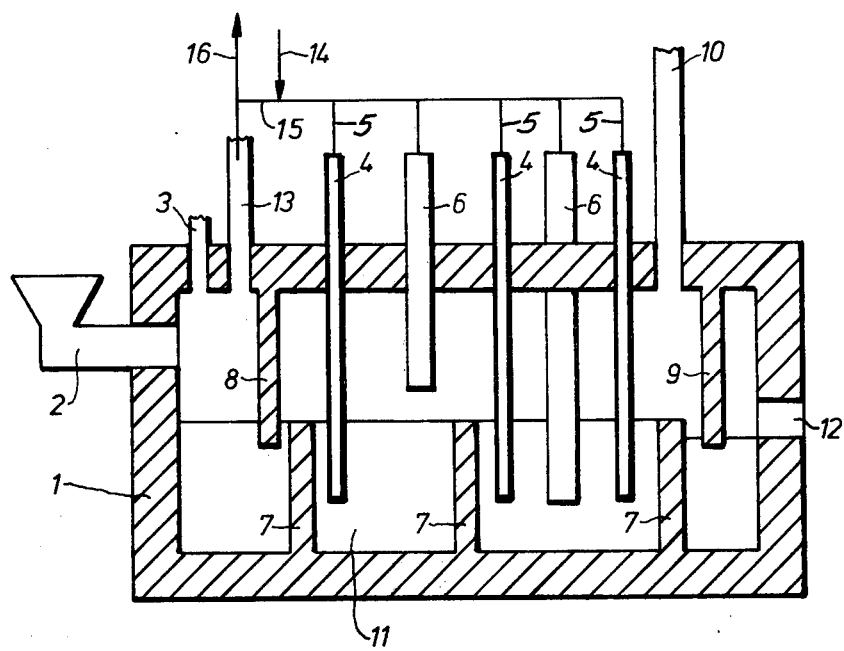

PURIFYING SALTS CONTAINING ORGANIC POLLUTANTS

In numerous industrial processes, accumulations of organically polluted, salt-containing effluents and organically polluted salts are formed. These cannot be discharged into receiving waters or dumped into being purified and known, non-thermal purification processes cannot be applied to them on technical and/or economic grounds.

In one known process, effluents of the kind in question are burnt in the gas phase. To this end, the effluents are sprayed into a combustion chamber and, together with fuel, are vaporized and burnt off at temperatures of around 1000° C. However, at the high flame and combustion-zone temperatures of this known process, which are required for completely burning off both the smoke gases and the salts, the inorganic salts are partly pyrolytically decomposed or evaporated. As a result, the smoke gases contain after cooling large amounts of acids and acid anhydrides, for example HCl, $SO_2$, $SO_3$, and also high concentrations of salt dusts with extremely small particle sizes.

Up to 100% by weight of the salts used can be discharged with the smoke gases. On account of the fact that the smoke gases are so heavily laden with salts, the exhaust gases in this known process have to be purified in a complicated, multistage process. In addition, this known process is highly energy-intensive.

An object of the present invention is largely to avoid the disadvantages of conventional processes, especially their high reaction temperatures, and to enable the organic constituents to be oxidized as completely as possible with as small a quantity of smoke gases as possible.

Accordingly, the present invention provides a process for purifying organically polluted salts or salt sludges by heat treating the salts or salt sludges in the presence of oxygen, wherein the salts are melted, optionally in the presence of fluxes, and are contacted with oxygen-containing gases at temperatures of from about 600° to 900° C.

The present invention also provides a closed, optionally ceramically lined tank furnace preferably divided into at least two chambers and comprising a feed pipe for a salt or salt sludge, one or more gas feed pipes and/or auxiliary burners, at least one discharge pipe for molten salt and exhaust gas and one or more optionally hollow dipped electrodes.

In the process according to the invention, organically polluted salts or organically polluted salt-containing solutions or aqueous suspensions are purified after preliminary concentration by evaporation either to dryness or to a low residual moisture content (up to about 30% by weight of $H_2O$).

The salts present may be sulphates, chlorides, phosphates, nitrates or borates of the alkali and alkaline earth group, either as such or in admixture with salts of the light-weight metals such as, for example, Al, B or Ti-salts, heavy metals such as, for example, Fe, Ni, Cu, Mo, Zn, V or Zr-salts or noble metals, such as, for example, Pt, Ru, or Pd-salts.

The light-weight metal, heavy metal and/or noble metal salts are generally present in quantities of up to about 10% by weight, based on the total amount of salt. In special cases, for example in the working up of organically polluted catalyst residues, the metal salts may even be present in larger quantities, for example about 90%. Sulphates and chlorides of the alkali group are preferably present.

The organic pollutants may consist of aliphatic, alicyclic or aromatic heterocyclic compounds and naturally occurring substances, e.g. dyestuff production waste, etc.

The organically polluted salts obtained after drying, which may contain from about 1 to 70% by weight of organic substances, based on the total salts, are fused, followed by oxidation of the organic constituents by oxygen which is introduced. The salt melt acts as a heat carrier and reaction medium. Air, oxygen-enriched air or technically pure oxygen may be used for oxidizing the organic constituents. Preferably, oxygen is only introduced in the quantities required to obtain complete oxidation of the organic constituents in the salt residue. The temperature prevailing in the salt melt is preferably adjusted to between about 100° C. and 300° C. above the melting temperature of the salt residue. By adding fluxes, such as for example sodium hydroxides, soda, sodium nitrate, sodium borate, sodium pyrosulphate or $NaH_2PO_4$, it is possible to lower the melting point by about 50° to 500° C. Fluxes such as these are added in the usual quantities of from about 5 to 30% by weight, based on the inorganic salts in the salt residue.

By comparison with the known thermal processes, which operate at the usual combustion temperature of the organic constituents of about 1000° C., the combustion temperature can be lowered by about 100° to 400° C. in the process according to the invention.

In one special variant of the process according to the invention, it is possible to influence the composition of the waste air formed during the oxidation step by the introduction of acid or basic additives. Suitable acid additives are, for example, pyrophosphates and pyrosulphates. Examples of suitable basic additives are alkali and alkaline earth metal oxides, hydroxides and carbonates.

These additives are used in quantities of up to about 30% from about 5 to 30% by weight, based on the inorganic salts in the salt residue. In another embodiment of the process according to the invention, the exhaust gas formed during combustion is passed through the melt before being subjected to a standard waste-gas purification treatment. In this way, it is possible to obtain even further degradation of the organic constituents and to reduce the amount of fly ash in the smoke gas.

The reaction enthalpy liberated during oxidation of the organic constituents or organic fuels, which are mixed into the polluted salts, in the melt partly or completely covers the energy required for the process. Any additional energy required may be introduced by burning organic fuels such as, for example, fuel oil, heavy oil, waste oils, gaseous fuels or organic waste products, or by direct or indirect electrical heating. In cases where the energy is supplied by electricity, direct heating through electrodes is preferred. The electrodes, which may consist for example of Fe, Mo, V, Ni, Cr-alloys or metal-oxide (for example Sn, Zn-oxides) dotted ceramic, dip into the salt melt and may be cooled for example with air or water.

The electrical energy is supplied in the form of alternating current or three-phase current at voltages of about 10 to 100 volts.

The process according to the invention may be ccarried out in air-cooled or water-cooled ceramically lined or double-walled metal vessels. The reaction vessels are preferably in the form of a tank which may even be divided up into several, preferably 2 to 4, chambers in order to improve the residence-time behavior. By means of suitable fittings, the waste gas formed can be forced to pass through the melt again. The wall of the reation vessel is preferably kept at such a temperature that a solid salt skin, preferably about 1 to 30 mm thick, is present on it. Excellent protection against corrosion is obtained in this way. Waste heat from the cooling of the reaction vessel may be used in known manner for preheating the oxygen-containing gas which is used for oxidation, or for generating steam.

One example of an apparatus suitable for carrying out the process according to the invention is described in the accompanying drawing which is a schematic sectional view. The reference numerals used have the following meanings:

1. ceramically lined tank furnace
2. introduction of the salts polluted with organic constituents through a screw
3. auxiliarly burner
4. dipped electrodes
5. introduction of the oxygen-containing gas through electrodes
6. additional input of oxygen-containing gas
7. fittings
8., 9. dipped walls
10. exhaust gas outlet
11. salt
12. outlet for purified melt
13. component waste air stream
14. oxygen feed
15. preheating of oxygen-containing gas by admixture with part of the hot exhaust gas
16. exhaust gas outlet.

More particularly, the reference 1 denotes a ceramically lined tank furnace. The salt polluted with organic impurities is introduced below or above the bath surface through 2. Some of the melting heat required, especially during the warm-up phase of the apparatus, is delivered by means of one or more auxiliary burners 3 in which an oil/air mixture for example is burnt supplying hot combustion gases to the tank furnace. Through the dipped electrodes 4, which are internally hollow, more energy is delivered for maintaining the necessary temperature in the salt melt. The electrodes are preferably cooled directly by the oxygen-containing gas which is internally introduced through them into the salt melt. By means of the fittings 7 and dipped walls 8 and 9, the melting furnace can be divided up into several chambers (four chambers in the embodiment illustrated). The exhaust gases formed during oxidation of the organic constituents in the first chamber are guided through the dipped wall 8, under the dipped wall and through the melt into the next chamber. The exhaust gases escape at 10 and may optionally be subjected to a standard smoke-gas wash (not shown). The salt melt 11 leaves the tank furnace in purified form at 12. In addition to being introduced through the electrodes, oxygen-containing gas may also be introduced through additional pipes 6 into and onto the salt melt. A salt skin is produced on the inner wall of the tank furnace by suitable cooling for example with water or with the oxygen-containing gas, and protects this wall against corrosion. In addition, a wear-resistant layer, for example a coating of $Al_2O_3$, may also be applied to the inner wall of the furnace.

A much smaller amount of waste gas with a lower content of salt dusts and aerosols and inorganic gases, such as HCl, $SO_2$ or $SO_3$, accumulates in the process according to the invention for purifying organically polluted salts or salt sludges than in conventional thermal processes. The oxygen is preferably delivered in only the slight excess required for oxidizing the organic constituents in the salt or salt sludge The input of additional energy may be controlled in such a way that local overheating is avoided in the salt melt, thereby greatly inhibiting aerosol formation. The degradation of the organic substances in the salt melt is substantially complete. Since the heat in the melt can be directly produced, for example by direct electrode heating or by finely divided fuels added to the salt residue, it is possible to obtain effective protection of the reaction vessel against corrosion by building up a solid salt skin on the inner wall of the vessel through co-ordinated cooling.

The process according to the invention is illustrated by the following examples:

EXAMPLE 1

20 kg/h of an industrial salt mixture ($Na_2SO_4$NaCl and $K_2SO_4$) containing 14% of nitrogen-containing organic constituents were continuously introduced at 780°–840° C. into a thoroughly burnt melt of the salt mixture. For a residence time of 1.5 to 2 hours, a carbon burn-off of more than 99% (99.4%) was obtained with air as the combustion gas.

The melt flowing out was light grey. The salt melt was heated by resistance heating (salt melt as conductor) through water-cooled sheet metal electrodes (30–40 V at 300–400 amps alternating current).

Melting range of the salt mixture used: 700°–720° C.
Smoke gas: $\leq 10$ mg/$Nm^3$ HCl
25 mg/$Nm^3$ $NO_x$ (calc. $NO_2$)
600 mg/$Nm^3$ fine dust
33 mg/$Nm^3$ organic carbon

EXAMPLE 2

10 kg/h of an industrial salt mixture ($Na_2SO_4$, NaCl and $K_2SO_4$) containing 18% of nitrogen-containing and sulphur-containing organic constituents were continuously introduced at 800° to 840° C. into a thoroughly burnt melt of the salt mixture. For a residence time of 1 to 2 hours, a carbon burn-off of 95 to 96% was otained with air as the combustion gas (preheated to 450° C.). The melt flowing off was grey.

Melting point of the organically polluted salt: 720°–760° C. –
Smoke gas: —100 mg/$Nm^3$ $Cl^{\ominus}$
30–40 ppm $NO_x$ (calc. $NO_2$)
30 mg/$Nm^3$ organic carbon
35 mg/$Nm^3$ fine dust
$<1$ ppm $H_2S$
3.1 gS/$Nm^3$ ($SO_2$/$SO_3$)

By adding 10% of soda ($Na_2CO_3$) as basic additive and 50% of NaCl as flux, it was possible to reduce the amount of sulphur in the smoke gas by 74%.

EXAMPLE 3

A salt mixture of $Na_2SO_4$, NaCl and $K_2SO_4$ containing 50% of organic aromatic constituents was introduced at 800° C. into the thoroughly burnt melt. The organic constituents were burnt off with flame formation. Air was used as the combustion gas. The carbon burn-off amounted to more than 99%.

It will be appreciated that the instant specification and examples are set forth by way of illustration and not limitation, and that various modifications and changes may be made without departing from the spirit and scope of the present invention.

What is claimed is:

1. A process for removing organics from a sulphate, chloride, phosphate or nitrate salt of an alkali or alkaline earth metal or sludges thereof polluted with about 1 to 70% by weight of organic substances, based on said salt, comprising continuously supplying and forming a melt of said salt at a temperature of from about 600° to 1000° C. by direct electrode resistance heating, contacting said formed melt with an oxygen-containing gas in a plurality of successive stages while advancing the salt through said stages, continuously withdrawing purified salt as a product from the last stage, and continuously withdrawing waste gases.

2. A process as claimed in claim 1, wherein melting of said salt is carried out in the presence of up to about 30% by weight, based on the salt feed, of an acid or basic flux.

3. A process as claimed in claim 1, wherein the melt is at a temperature from about 100° to 300° C. above the melting point of the salts.

4. A process as claimed in claim 1, wherein the oxygen-containing gas is delivered to the salt melt through hollow electrodes.

5. A process as claimed in claim 1, including the step of cooling the wall of the container for the melt to such an extent that a solid salt layer is formed on the inside of the wall which protects it against corrosion.

6. A process as claimed in claim 1, wherein melting of the salt is carried out in the presence of about 5 to 30% by weight of the inorganic salts of an acidic or basic flux, the melt is at a temperature from about 100° to 300° C. above the melting point of the salts, and the wall of the container for the melt is cooled to such an extent that a solid salt layer is formed on the inside of the wall which protects it against corrosion.

7. A process as claimed in claim 1, including the further steps of passing a portion of said waste gases through the melt, thereby to purify and reduce the amount of fly ash in the waste gases.

* * * * *